United States Patent [19]
Wellensiek

[11] 3,978,263
[45] Aug. 31, 1976

[54] WATER-PERMEABLE FLOOR COVERING BOARDS

[75] Inventor: Günther Wellensiek, Bonn-Bad Godesberg, Germany

[73] Assignee: Verton & Wellensiek, Bonn-Bad Godesberg, Germany

[22] Filed: Aug. 12, 1974

[21] Appl. No.: 496,727

Related U.S. Application Data

[63] Continuation-in-part of Ser. No. 130,827, April 2, 1971, abandoned.

[30] Foreign Application Priority Data
Mar. 8, 1971 Germany .............................2110972

[52] U.S. Cl. ................................ 428/306; 156/79; 156/254; 156/331; 156/338; 260/2.5 BE; 260/2.5 AT; 264/45.3; 264/46.5; 264/160; 264/DIG. 7; 428/310; 428/327

[51] Int. Cl.² ........................................... B32B 5/18

[58] Field of Search............ 264/DIG. 7, 45.3, 46.5, 264/157, 160; 156/79, 254, 331, 338; 161/160, 161; 428/306, 327; 260/2.5 BE, 2.5 AT

[56] References Cited
UNITED STATES PATENTS

| | | | |
|---|---|---|---|
| 3,240,855 | 3/1966 | Voelker............................ | 264/46.3 |
| 3,251,916 | 5/1966 | Newnham et al............. | 264/DIG. 7 |
| 3,537,929 | 11/1970 | Keith et al............................ | 156/79 |

FOREIGN PATENTS OR APPLICATIONS
1,178,949  1/1970  United Kingdom

*Primary Examiner*—Edward G. Whitby
*Attorney, Agent, or Firm*—Erich M. H. Radde

[57] ABSTRACT

Disclosed is a process for manufacturing elastic floor covering boards comprising a lower, water-permeable layer of natural or synthetic rubber particles bound together by an adhesive and a cover layer of non-woven synthetic textile fibers, which process comprises placing into a mold the cover layer of non-woven synthetic textile fibers, impregnating this layer with a resilient, heat-curable adhesive, placing the particles of natural or synthetic rubber which are likewise impregnated with said adhesive on top of the fibrous layer and subsequently compressing both layers in the mold at a temperature below 100°C. and at a pressure of from 40 to 100 metric tons per square meter until the adhesive is cured. Advantageously, a woven reinforcing layer is interposed between the two layers prior to molding to provide an exceptionally strong and stable product.

12 Claims, 3 Drawing Figures

WATER-PERMEABLE FLOOR COVERING BOARDS

CROSS-REFERENCE TO RELATED APPLICATION

This is a continuation-in-part of application Ser. No. 130,827, filed Apr. 2, 1971 now abandoned.

BACKGROUND OF THE INVENTION

The present invention relates to elastic floor covering boards and to a process for manufacturing such boards. The floor covering boards comprise a lower water-permeable layer of particles of vulcanized synthetic or natural rubber which are bound together by an adhesive, an optional intermediate reinforcing layer and a cover layer of a non-woven fabric or felt of synthetic fibers.

Floor covering boards of this general type which are particularly suitable for surfacing playgrounds and sports fields are known, e.g., from British Patent No. 1,178,949. The manufacture of the known floor covering boards is carried out by blending the rubber particles, which have been freed from fines and dust and which preferably have sizes of from several millimeters up to a few centimeters, with the adhesive in a weight ratio appropriate to provide a water-permeable final layer, placing said impregnated particles into a form and leaving the impregnated particles within the form until the adhesive is cured and a strong bond is obtained. Finally, the cover layer comprising a section of a non-woven fabric or felt is glued to the pre-constructed lower layer of rubber particles.

It has been found that floor covering boards manufactured by such a process have several disadvantages. In particular, thin floor covering boards having exact measurements can be manufactured only with difficulties because it is nearly impossible to place the rubber particles sufficiently uniformly into the form so that a separate layer of rubber particles having an even thickness is obtained. Further, the glueing of the felt layer on top of the pre-formed base layer of rubber particles is difficult because the edges of the felt layer must coincide with the edges of the lower layer and also because the material is subjected to tensions if the adhesive used for the rubber particles is not completely cured, thus causing warps and voids. The adjusting and leveling of the finished floor covering boards by grinding or processing the edges is cumbersome and difficult, in particular if the edges are provided with grooves. Finally, the bond between the lower layer of rubber particles and the cover layer of non-woven fabric or felt is frequently insufficient for the intended use of the boards for surfacing playgrounds and sports fields, and the prior art process is limited to the use of pre-formed webs of non-woven fabric or felt.

SUMMARY OF THE INVENTION

An object of the invention is to provide an improved, single molding operation process for the manufacture of water-permeable, elastic floor covering boards comprising a lower layer of particles of synthetic or natural rubber which are bonded together by an adhesive, an optional reinforcing layer and a cover layer of a non-woven fabric or felt of synthetic fibers, which process overcomes the disadvantages of the prior art technique and provides particularly well-bonded layers having precise dimensions.

A further object of the invention is to provide an improved process for the manufacture of two elastic floor covering boards in a single manufacturing step.

Another object of the invention is to provide a process for manufacturing elastic floor covering boards having attached thereto a layer or strip of binder material, in particular, for binding said board to asphalt surfaces, again utilizing only a single manufacturing step.

Still a further object of the invention is to provide a floor covering board manufacturing process wherein a cover layer of non-woven fabric for the board is formed in situ from a loose layer of synthetic fibers, such as chopped fibers or staple fibers.

A further object of the invention is to provide novel elastic floor covering boards having additional drainage holes within the lower layer of rubber particles.

It is also an object of the present invention to provide an improved floor covering board by inserting a particular reinforcing layer between the base and cover layers, during the single operation manufacturing process.

In accomplishing these and other objects, there is provided according to the present invention a process for manufacturing elastic floor covering boards comprising a lower water-permeable layer of particles of synthetic or natural rubber which are bonded together by an adhesive, optionally an intermediate reinforcing layer, and a cover layer of a non-woven fabric or felt of synthetic fibers, which process comprises placing into a mold the cover layer comprising either a pre-formed, non-woven fabric or felt of synthetic fibers, or a layer of felt-forming synthetic fibers, impregnating said layer with a resilient adhesive, depositing particles of synthetic or natural rubber which have been impregnated (either before or concurrent with said depositing) with a similar adhesive on top of said layer, providing a small amount of foaming agent for the adhesive, closing the mold and pressing both layers at a temperature between room temperature and 100°C. and at a pressure of from 40 to 100 metric tons per square meter until the adhesive is cured.

Another feature of the invention comprises a process wherein a layer of non-woven fabric or a loose layer of felt-forming fibers is placed into the mold as a lower layer and is impregnated with a curable adhesive. There is then deposited a layer of adhesive-impregnated rubber particles followed by another, top layer of non-woven fabric or felt or a layer of felt-forming fibers which is then also impregnated with adhesive. After pressing and curing under the above conditions, a planar three-layer board is obtained which is then cut through and entirely within the rubber particle layer in the plane of the board such that, upon separation, there are obtained two floor covering boards from a single mold in a single step, each board having two layers as described above and being water-permeable.

According to a preferred embodiment of the invention there are provided additional drainage holes within the layer of rubber particles during pressing, for example, by placing a plurality of pins in the mold protruding from the surface which presses into contact with the layer of adhesive-impregnated rubber particles. Alternatively, these additional drainage holes may be provided by punching or drilling after the floor covering boards are produced.

According to a further preferred embodiment of the invention, a layer of non-woven fabric or felt or a layer of felt-forming synthetic fibers is pressed in combination with a layer of rubber particles and a further layer or strips of a binder material particularly suited for asphalt surfacing compositions. In this embodiment, a temperature below the softening temperature of the binder material is used during board manufacture. The layer of binder material may consist of, e.g., a blend of asphaltous or bituminous substances with lower molecular polyolefins, such as low molecular weight polyethylene, extender oils and the like materials.

According to another feature of the invention, there is provided an improved, reinforced floor covering board comprising a water-permeable backing layer of adhesively bonded natural or synthetic rubber particles, a cover layer of adhesively bonded synthetic fibers and an intermediate reinforcing layer comprising a woven fiber web. This reinforced floor covering board is most advantageously prepared according to the above-described single operation process utilizing the additional step of introducing the woven fiber web, optionally with a coating of adhesive, into the mold subsequent to the layer of synthetic fibers and before the layer of rubber particles.

Other objects, features and advantages of the invention will be apparent from the following description when taken with the accompanying drawings.

DETAILED DESCRIPTION OF THE INVENTION

Figure 1:
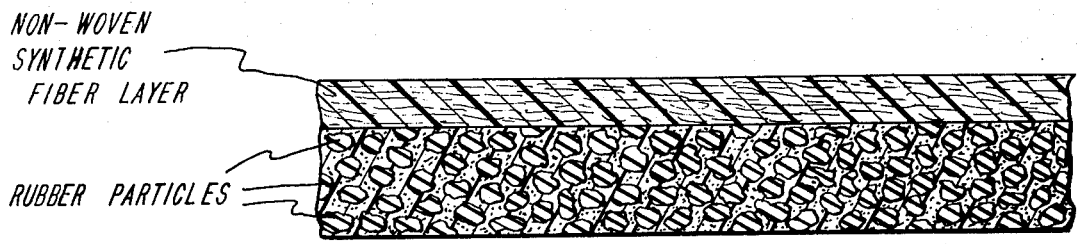
FIG. 1 is a cross-sectional view of a two-layer floor covering board in accordance with the present invention.

The water-permeable, elastic floor covering boards of the invention are characterized by a backing layer of adhesively bonded particles of natural or synthetic rubber having average particle sizes between about 0.2 and 4 cm. and a surface layer of adhesively bonded non-woven synthetic fibers. The backing layer may vary in thickness between 0.8 and 5 cm., whereas the covering layer of fibers typically has a thickness between about 0.4 and 7.2 cm. A typical board is illustrated in FIG. 1 of the drawings. The adhesive used to bond together the synthetic fibers in the cover layer, the rubber particles in the backing layer and the two layers themselves is a resilient adhesive which is preferably a polyurethane curable at a temperature between room temperature and 100°C. In order to provide the proper degree of water-permeability to the backing layer, generally the weight ratio of adhesive to the rubber particles is within the range of 0.13:1 to 0.2:1. The ratio of adhesive to synthetic fibers is not critical and typically ranges between 1 : 20 and 1:10.

The cover layer is a felt, e.g., a needle felt, of synthetic fibers of the general type used in synthetic textile products. The felt may either be pre-formed or formed in situ during molding of the floor covering boards, and it is typically comprised of fibers having lengths between about 1.0 and 5 cm. Preferred synthetic fibers are polyamide fibers (nylon), for example, of caprolactam polymers, although other common synthetic fibers such as polyester, polyacrylonitrile, acrylonitrile copolymers, polyolefins, especially polypropylene, and the like may also be employed.

The rubber material utilized for the backing layer may be either natural rubber or a synthetic rubber such as polybutadiene, polyisoprene, olefin-acrylonitrile or diolefin-styrene and/or acrylonitrile rubbers. The rubber material is preferably vulcanized, and most advantageously, rubber waste material such as cut-up tire scrap containing tire cord, etc., is utilized. The rubber may also contain various conventional fillers or extenders, e.g., asbestos, glass fiber and the like.

As the adhesive employed to bond together each individual layer as well as the layers to one another, there may be employed any resilient adhesive material capable of forming an open-celled foam during the pressure molding step. It has been found that particularly valuable multipurpose floor coverings according to the present invention are obtained by utilizing certain foamable or foamed polyurethane adhesive forming materials derived from polyisocyanate-polyester reaction products. More specifically, the preferred foamable polyurethane forming adhesive material comprises an addition product of a polyol, e.g., a hydroxy containing polyester or polyether, with an aliphatic or aromatic polyisocyanate, such as a mixture of isomeric toluene diisocyanates or p,p'-diphenylmethane diisocyanate. A suitable foamed or cellular-structured polyurethane adhesive is obtained by including up to 5% of water based on the total mixture or other foaming agent in the reaction medium and various other additives including long chain esterified fatty acids, e.g., castor oil, stabilizers, foam inhibitors, emulsifiers, fungicides and similar materials may be incorporated in the reaction mixture to enhance specifically desired properties of the adhesive. An amount of water is provided sufficient to produce an open-celled foam adhesive structure during the pressure molding step. This amount of water typically ranges between about 0.5% and about 5% based upon the total adhesive material, and may be provided separately or contained in the rubber particles.

The improved process of the present invention comprises a single molding operation for the production of floor covering boards having improved physical properties and improved performance. The following steps are conducted in the process:

A first layer of synthetic fibers is placed into one section of a typically square or rectangular mold. The fibrous layer is either in the form of a pre-formed non-woven fabric or felt or is a layer of loose synthetic felt-fibers. The thus-deposited layer of synthetic fibers is then impregnated with an adhesive of the type described hereinabove, and upon this impregnated layer there is deposited a layer of natural or synthetic rubber particles which have likewise been impregnated with the subject adhesive. The required amount of water or other foaming agent is provided in the system. Impregnation of the rubber particles may be pre-accomplished or it may take place concurrently with the deposit of the rubber particle layer into the mold. The mold is then closed and the layers are pressed together at a pressure of from about 40 to 100 metric tons per square meter and at a temperature which is typically at room temperature or above, but not above 100°C., for a period of time sufficient to cure the adhesive.

This process provides elastic, water-permeable floor covering boards in a single molding operation which hold their dimensions precisely and which are very uniform. By applying the foregoing process conditions, and selecting the above-described materials, there is obtained a product wherein voids or interstices remain between the individual rubber particles to provide an inherently water-permeable backing layer. The cover layer of bonded fibers is in any case water-permeable. Furthermore, the felt layer is closely and uniformly bonded to the lower layer of rubber particles, and optionally, in the case of forming a felt in situ from fibrous materials, it is possible to produce a felt which may be adapted to any intended use, thus overcoming the limitations involved with the use of commercially available non-woven fabrics or needle felts.

Figure 3:
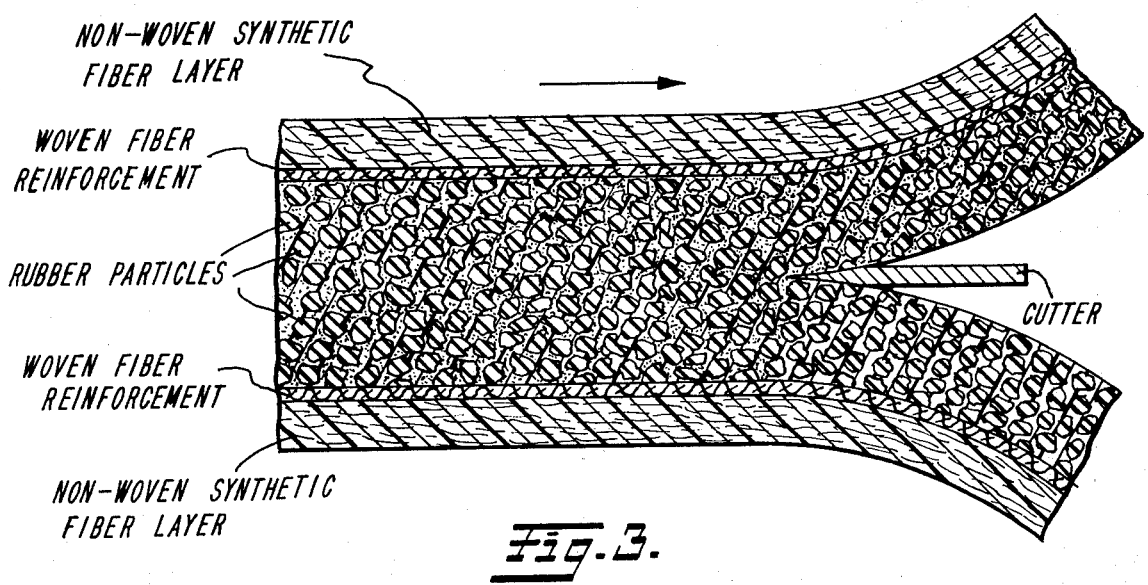
FIG. 3 is a schematic illustration of the step wherein two separate floor covering boards are produced by cutting a multiple-layer laminate in the plane of the layer of bonded rubber particles.

In an alternative embodiment of the present invention, it is possible to modify the above process to produce two floor covering boards of the indicated type, again by employing only a single molding operation. This alternative is carried out by following the above-delineated process steps, and then subsequent to deposition of the layer of impregnated rubber particles, there is deposited yet another layer of synthetic fibers upon the rubber particle layer, and this second covering layer of fibers is then also impregnated with the adhesive. Upon closing the mold and molding the contents under the conditions set forth above, there is produced a three-layer, generally planar laminate having two parallel principal exterior surfaces comprised of the adhesively-bonded synthetic fibers and a central generally planar core layer of the bonded rubber particles. This multiple-layer laminate is then cut across and completely within the plane of the central core layer of rubber particles, such that two separate two-layer floor covering boards meeting the requirements of the invention are produced. This step of severing the multiple-layer laminate is schematically illustrated in FIG. 3 of the drawings.

It has been found that by using the process of the invention it is possible to control the resilient and elastic properties of the layer of rubber particles in a simple manner by controlling the kind and amount of the rubber particles used and the pressure applied during manufacture. By applying a lower pressure which compresses the layer of rubber particles by only about 20 to 40%, softer floor covering boards having large depth elasticity values, as desired for riding sports, are obtained. On the contrary, by compressing the layer of rubber particles by a factor of about 40 to 70% during manufacture, hard boards are obtained which may be suited, for example, for race-courses.

The resilient properties may be controlled by choosing the adhesive accordingly. Thus by using a polyurethane adhesive in situ with added water or another foaming agent, a foam-like bond between the rubber particles is obtained; accompanied by decreasing rebound values. This is advantageous when the floor covering boards are heavily stressed, e.g., by using the boards on horse riding fields. The danger of ankle injuries to horses is thereby minimized.

According to a further preferred embodiment of the invention, a layer of non-woven fabric or felt or a layer of felt-forming synthetic fibers is pressed in combination with a layer of rubber particles and a further layer or strips of a binder material particularly suited for asphalt surfacing compositions. In this embodiment, a temperature below the softening temperature of the binder material is used during board manufacture. By this process, a self-adhering floor covering board is provided which is easier to lay, particularly on top of asphalt, and which has improved utility. The layer of binder material may consist of, e.g., a blend of asphaltous or bituminous substances with lower molecular polyolefins, such as low molecular weight polyethylene, extender oils and the like materials. The binder material may be used in the form of bands or strips, thus saving material without affecting the adhesive properties and water permeability of the finished floor covering board.

According to a further embodiment of the process of the invention, a surprisingly improved floor covering board is produced by providing a reinforcing layer between the layer of non-woven fibers and the layer of adhesive impregnated rubber particles. For this reinforcing layer there is used a woven fiber web wherein the openings between fibers are of such a size that the reinforcing web is water-permeable. To incorporate such a reinforcing web into floor covering boards produced in accordance with the heretofore employed manufacturing process, as described in British Pat. No. 1,178,949, for example, does not provide as great of a benefit in terms of improved strength and stability of the product. On the other hand, when such a web is incorporated by means of the single stage process of the invention, especially where a loose layer of felt-forming fibers is first deposited in the mold, a degree of bonding takes place between the web and both the fibrous layer below and the layer of rubber particles above which produces an exceptionally strong and stable floor covering board. The woven fiber web may itself be coated or impregnated with an adhesive to facilitate bonding.

Figure 2:
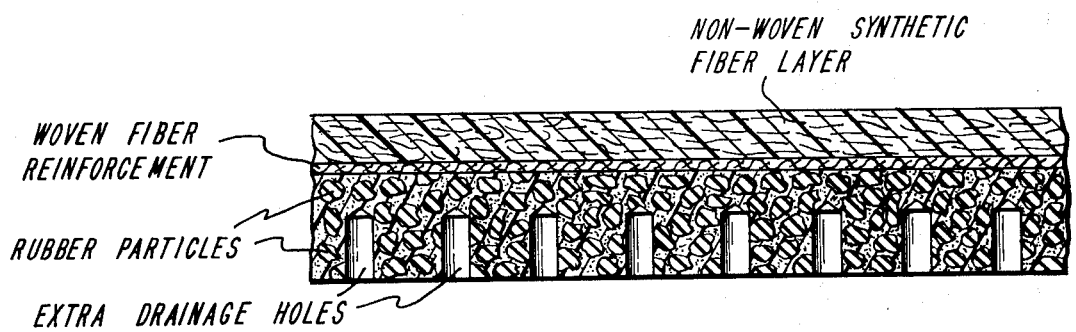
FIG. 2 is a cross-sectional view of a reinforced floor covering board of the invention also having additional drainage holes.

The woven reinforcing layer may consist of a fabric of synthetic fibers such as glass fibers, synthetic resinous fibers, e.g., nylon, or of natural fibers such as jute fibers or the reinforcing web may be a plastic material, e.g., a polyester, reinforced with such fibers. In the last instance it may be necessary to perforate the web. The reinforcing layer is placed into the mold before pressing, thus enabling further control of hardness and resilient properties of the floor covering boards, making them suitable for surfacing sports fields, such as tennis courts and the like. FIGS. 2 and 3 of the drawings illustrate floor covering boards manufactured with a woven reinforcing layer. Such a layer may be from 0.2 to 2.0 mm in thickness.

The intermediate layer described hereinabove serves to adapt the backing or bottom layer to its contemplated use. Thickness and dynamic stiffness, rigidity, and/or inflexibility of this layer may vary in accordance with the contemplated use of the floor covering board since these characteristics affect the properties of the floor covering board to a considerable extent.

The floor covering board without intermediate layer is designed so as to achieve optimum resilience with respect to its cushioning properties. This is achieved as described hereinabove, by selecting the pressure applied during its manufacture and by its total thickness. When a body of 75 kg. falls from a height of 1 m. the optimum energy recovery must be between 77% and 83%. Values below this percentage yield a floor covering which has an energy consuming or wasting effect upon the sportsman. Values which are above these values may seriously injure his joints and muscles.

The above-described intermediate layer affects primarily the behavior of a ball, for instance, of a volley ball, a football, or a cricket ball. The reflection of the ball whereby a volley ball is used to determine medium values, namely of a height of drop of 1.8 m. and of a reflection of 1.35 m., increases with the thickness and the rigidity of this intermediate layer.

In all instances, however, the intermediate layer is to be constructed as a web, net, or grit, so as to assure its water permeability.

Other reinforcing layers consisting of thin plywood, hardboard, metal sheets or structural steel wire netting may be employed together with the woven web reinforcement.

According to a preferred embodiment of the invention there are provided additional drainage holes within the layer of rubber particles during pressing, for example, by placing a plurality of pins in the mold protruding from the surface which presses into contact with the layer of adhesive-impregnated rubber particles. Alternatively, these additional drainage holes may be provided by punching or drilling after the floor covering boards are produced. The holes preferably have a width of several millimeters, e.g., 1 to 5 mm., and the boards are provided with from 10 to 1000 holes per square meter, in particular from 200 to 600 per square meter without adversely affecting the mechanical strength of the floor covering board, but resulting in an increase of the utility of the boards, in particular for the use as surfacing material for sports fields. A saving in rubber material is also effected thereby. These drainage holes are shown in FIG. 2 of the drawings.

For example, a floor covering board manufactured according to the invention having 50 to 120 cm. side dimensions may comprise a lower layer of rubber chips or rubber granules having a particle size of 0.5 to 12 mm., the layer being 10 to 40 mm. thick, a covering layer of a non-woven fabric or needle felt of nylon fibers 5 to 15 mm. thick and an intermediate reinforcing layer of glass fiber reinforced polyester about 0.5 to 2 mm. thick.

Such floor covering boards typically have the following properties:

Walking acoustic absorptivity according to DIN 52 510 of 61 dB at an octave medium frequency of 125 cps to 23 dB at an octave medium frequency of 2800 cps; acoustic absorptivity according to DIN 4109 of +16 dB (concrete 12 cm. thick with 2 to 3 cm. smooth flooring: −13 dB) at an acoustic room volume of 61 m$^3$; thermal contact resistance 1/Λ of 0.3 to 0.4 m$^2$.h.°c/kcal, for example, 0.342 with a 20 mm. thick layer rubber particles and a 4 mm. thick layer of long nylon fibers; equivalent thermal conductance Λa of 0.071 kcal/m.h.°C (temperature base 10°C).

Before pressing, the layer of rubber particles may be provided with reinforcing inlays, such as reinforcing wire or wire netting as illustrated in British Pat. No. 1,178,949 and/or heating elements. This results in advantageous floor covering boards for special uses, such as sports fields which may be used in the winter season.

The single mold process of the present invention is further illustrated by the following non-limiting examples.

EXAMPLE I

A first layer of pre-formed non-woven fabric is placed in a conventional rectangular mold. The deposited fabric layer is impregnated with a foamable polyurethane adhesive prepared from the following components:

a. Polyisocyanate component: a mixture of toluene-2,4-diisocyanate and toluene-2,6-diisocyanate; 60 parts based upon the total mixture;
b. Polyester-component: a mixture of 40% by weight of castor oil and 60% by weight of a branched polyester obtained by the reaction of adipic acid, butylene glycol and glycerine, viscosity at 75°C.=300–400 cps, hydroxyl number = 158–175, acid number = <4, density ca. 1.12; 40 parts based upon the total mixture;
c. Activator: 6 parts based upon the total mixture of triethylamine;
d. 3 parts based upon the total mixture of a conventional emulsifier; and
e. 2 to 9% by weight with respect to the total mixture of powdered zeolite as a foam inhibiting agent.

A layer of natural rubber particles impregnated with the foamable polyurethane forming adhesive detailed above is deposited on the impregnated fabric layer and 3% water by weight based upon the total adhesive is added to the system. The mold is then closed and the layers of fabric acid rubber are pressure bonded at a pressure of 60 metric tons per square meter at room temperature for a sufficient time to permit foaming and curing of the polyurethane adhesive.

EXAMPLE II

The process of Example I is repeated except that a previously prepared heat-hardenable polyurethane adhesive is utilized to bond the rubber particles together and to unite the synthetic fabric layer with the rubber layer. The polyurethane adhesive has a viscosity of 300–900 cps at 75°C., an isocyanate content of between 9.5% to 10.5% and a density (ca.) of 1.24. In addition the pressure bonding is effectuated at a temperature of approximately 75°C. for a sufficient time to harden the adhesive in the mold.

I claim:

1. A process for producing in a single molding operation water-permeable, uniformly dimensioned elastic floor covering boards having a resilient, water-permeable backing layer of adhesively bonded rubber particles, and a water-permeable surface layer of adhesively bonded synthetic fibers, said layers being firmly bonded together, comprising the steps of
   a. depositing in a mold a layer of non-woven synthetic fibers,
   b. impregnating said layer of synthetic fibers with a resilient polyurethane adhesive,
   c. depositing on top of said layer of adhesive-impregnated synthetic fibers a layer of natural or synthetic rubber particles having a particle size of between 0.2 and 4.0 cm., said particles being impregnated with a resilient polyurethane adhesive,
   d. incorporating a foaming agent for said adhesive,
   e. closing said mold, and
   f. subjecting said layers in the closed mold to a temperature between room temperature and 100°C. and to a pressure between about 40 and about 100 metric tons per square meter for a period of time sufficient to effect curing of said adhesive, whereby a foamed adhesive matrix is produced in said floor covering boards.

2. The process as defined by claim 1, wherein said layer of non-woven synthetic fibers is a pre-formed web or felt of said synthetic fibers.

3. The process as defined by claim 1, wherein said layer of non-woven synthetic fibers comprises a loose layer of felt-forming synthetic fibers.

4. The process as defined by claim 1, wherein said synthetic fibers are selected from the group consisting of polyamide, polyester, polyacrylonitrile and polyolefin fibers.

5. The process as defined by claim 1, wherein said foaming agent comprises water.

6. The process as defined by claim 1, further comprising the step of placing on top of said adhesive-impregnated layer of synthetic fibers a reinforcing layer comprising a woven fiber web.

7. The process as defined by claim 6, wherein said reinforcing layer comprises a web of woven glass fibers.

8. The process as defined by claim 1, further comprising the step of providing a plurality of spaced drainage apertures in the resilient backing layer of adhesively bonded rubber particles concurrently with said molding step.

9. A water-permeable, elastic floor covering board having a resilient, water-permeable backing layer of adhesively bonded rubber particles and a water-permeable surface layer of adhesively bonded synthetic fibers, said floor covering board having been produced by the process defined by claim 1.

10. A water-permeable, elastic floor covering board having a resilient, water-permeable backing layer of adhesively bonded rubber particles and a water-permeable surface layer of adhesively bonded synthetic fibers, said floor covering board having been produced by the process defined by claim 6.

11. A process for producing in a single molding operation water-permeable, uniformly dimensioned elastic floor covering boards having a resilient, water-permeable backing layer of adhesively bonded rubber particles, and a water-permeable surface layer of adhesively bonded synthetic fibers, said layers being firmly bonded together, comprising the steps of
  a. depositing in a mold a layer of non-woven synthetic fibers,
  b. impregnating said layer of synthetic fibers with a resilient polyurethane adhesive,
  c. depositing on top of said layer of adhesive-impregnated synthetic fibers a layer of natural or synthetic rubber particles having a particle size of between 0.2 and 4.0 cm., said particles being impregnated with a resilient polyurethane adhesive,
  $c_1$. depositing on top of said layer of impregnated rubber particles a third layer comprising a layer of non-woven synthetic textile fibers,
  $c_2$. impregnating said third layer with a resilient polyurethane adhesive,
  d. incorporating a foaming agent for said adhesive,
  e. closing said mold,
  f. subjecting said layers in the closed mold to a temperature between room temperature and 100°C. and to a pressure between about 40 and about 100 metric tons per square meter for a period of time sufficient to effect curing of said adhesive, whereby a foamed adhesive matrix is produced in said floor covering boards, and
  g. cutting the resulting layer structure through and in the plane of the layer of adhesively bonded rubber particles parallel to the principal exterior surfaces of the board structure, whereby there is produced two floor covering boards, each having a covering layer of non-woven fibers and a water-permeable backing layer of adhesively bonded rubber particles.

12. A process for producing in a single molding operation water-permeable, uniformly dimensioned elastic floor covering boards having a resilient, water-permeable backing layer of adhesively bonded rubber particles, and a water-permeable surface layer of adhesively bonded synthetic fibers, said layers being firmly bonded together, comprising the steps of
  a. depositing in a mold a layer of non-woven synthetic fibers,
  b. impregnating said layer of synthetic fibers with a resilient polyurethane adhesive,
  $b_1$. placing on top of said adhesive-impregnated layer of synthetic fibers a reinforcing layer comprising a woven fiber web,
  c. depositing on top of said layer of woven fiber web a layer of natural or synthetic rubber particles having a particle size of between 0.2 and 4.0 cm., said particles being impregnated with a resilient polyurethane adhesive,
  $c_1$. depositing on top of said layer of impregnated rubber particles a second reinforcing layer comprising a woven fiber web,
  $c_2$. depositing on top of said second reinforcing layer a fifth layer comprising a layer of non-woven synthetic textile fibers,
  $c_3$. impregnating said fifth layer with a resilient polyurethane adhesive,
  d. incorporating a foaming agent for said adhesive,
  e. closing said mold,
  f. subjecting said layers in the closed mold to a temperature between room temperature and 100°C. and to a pressure between about 40 and about 100 metric tons per square meter for a period of time sufficient to effect curing of said adhesive, whereby a formed adhesive matrix is produced in said floor covering boards, and
  g. cutting the resulting five-layer structure through and in the plane of the layer of adhesively bonded rubber particles parallel to the principle exterior surfaces of the board structure, whereby there is produced two floor covering boards, each having a covering layer of non-woven fibers, a woven web reinforcing layer and a water-permeable backing layer of adhesively bonded rubber particles.

* * * * *